US012764378B2

(12) United States Patent
Ochiai et al.

(10) Patent No.: US 12,764,378 B2

(45) Date of Patent: Oct. 13, 2026

(54) VIDEO DATA TRANSMISSION DEVICE, RECEPTION DEVICE, AND TRANSMISSION AND RECEPTION SYSTEM

(71) Applicant: THINE ELECTRONICS, INC., Tokyo (JP)

(72) Inventors: Kazuo Ochiai, Tokyo (JP); Shun Ideguchi, Tokyo (JP)

(73) Assignee: THINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 19/108,275

(22) PCT Filed: Sep. 7, 2023

(86) PCT No.: PCT/JP2023/032683

§ 371 (c)(1),
(2) Date: Mar. 3, 2025

(87) PCT Pub. No.: WO2024/053708

PCT Pub. Date: Mar. 14, 2024

(65) Prior Publication Data

US 2026/0067531 A1 Mar. 5, 2026

(30) Foreign Application Priority Data

Sep. 8, 2022 (JP) ................................ 2022-142988

(51) Int. Cl.
*H04N 21/436* (2011.01)
*H04N 21/4425* (2011.01)

(52) U.S. Cl.
CPC ....... *H04N 21/436* (2013.01); *H04N 21/4425* (2013.01)

(58) Field of Classification Search
CPC ........................ H04N 21/436; H04N 21/4425
See application file for complete search history.

(56) References Cited

U.S. PATENT DOCUMENTS

2014/0285715 A1* 9/2014 Ozawa .............. H04N 21/4367 348/486
2018/0047331 A1* 2/2018 Murata .................... G09G 5/12

FOREIGN PATENT DOCUMENTS

JP 2010-525689 A 7/2010
JP 2015-204513 A 11/2015
(Continued)

OTHER PUBLICATIONS

International Search Report issued Nov. 7, 2023 in International Application No. PCT/JP2023/032683.
(Continued)

*Primary Examiner* — Gigi L Dubasky
(74) *Attorney, Agent, or Firm* — Sughrue Mion, PLLC

(57) ABSTRACT

Video data including active data and sync data is transmitted from a transmitting device to a receiving device. In a blanking period for transmitting the sync data, BS data is transmitted at the first cycle of the blanking period, BE data is transmitted at the last cycle of the blanking period, and PRE_BE data is transmitted N1 cycles before the BE transmission cycle. The receiving device reproduces the BE data based on the detected PRE_BE data or BE data, and reproduces the BS data based on the reproduced BE data or the detected BS data. Because external noise resistance is further strengthened, the active data and the sync data can be accurately separated from among the received data.

7 Claims, 8 Drawing Sheets

(56) References Cited

FOREIGN PATENT DOCUMENTS

| | | | |
|---|---|---|---|
| JP | 2018-26769 | A | 2/2018 |
| JP | 2018-46388 | A | 3/2018 |
| JP | 6667847 | B2 | 3/2020 |
| KR | 10-2005-0044297 | A | 5/2005 |
| KR | 10-2011-0102891 | A | 9/2011 |
| KR | 10-2011-0135961 | A | 12/2011 |
| KR | 10-2016-0144411 | A | 12/2016 |
| KR | 10-2017-0059757 | A | 5/2017 |
| KR | 10-2018-0129837 | A | 12/2018 |
| KR | 10-2020-0115238 | A | 10/2020 |
| WO | 2008/134873 | A1 | 11/2008 |
| WO | 2009/069430 | A1 | 6/2009 |

OTHER PUBLICATIONS

International Preliminary Report on Patentability with a Translation of Written Opinion in International Application No. PCT/JP2023/032683, issued on Mar. 1, 2025.

* cited by examiner

VIDEO DATA TRANSMISSION DEVICE, RECEPTION DEVICE, AND TRANSMISSION AND RECEPTION SYSTEM

CROSS-REFERENCE TO RELATED APPLICATIONS

This is a National Stage of International Application No. PCT/JP2023/032683 filed Sep. 7, 2023, claiming priority based on Japanese Patent Application No. 2022-142988 filed Sep. 8, 2022.

TECHNICAL FIELD

The present disclosure relates to a transmitting device, a receiving device, and a transmitting and receiving system.

BACKGROUND ART

Patent Literature 1 discloses a transmitting and receiving system for transmitting video data for displaying video on a video display device such as a liquid crystal display device. The transmitting and receiving system described in the literature includes a transmitting device that transmits video data including active data and sync data, and a receiving device that receives the video data transmitted from the transmitting device to display the video on the video display device.

In this transmitting and receiving system, the transmitting device receives active data and sync data that are to be transmitted to the receiving device, along with a DE signal (data enable signal). The transmitting device transmits the active data to the receiving device during a period (active period) in which the DE signal is at a first level (for example, H level). The transmitting device transmits the sync data to the receiving device during a period (blanking period) in which the DE signal is at a second level (for example, L level).

Further, the transmitting device transmits, to the receiving device, BS data (blank start data), which indicates the timing (the start timing of the blanking period) of the DE signal transition from the first level to the second level. Moreover, the transmitting device transmits, to the receiving device, BE data (blank end data), which indicates the timing (the end timing of the blanking period) of the DE signal transition from the second level to the first level.

The receiving device receives data sent via a transmission line from the transmitting device. From among such received data, the receiving device detects the BS data and the BE data, and reproduces the DE signal based on the timings at which these data are detected. In addition, based on the reproduced DE signal, the receiving device separates the received data into the active data and the sync data.

CITATION LIST

Patent Literature

Patent Literature 1: International Publication No. WO 2009/069430

Patent Literature 2: Japanese U.S. Pat. No. 6,667,847

SUMMARY OF INVENTION

Technical Problem

In the above transmitting and receiving system, when the data are transmitted from the transmitting device to the receiving device via the transmission line, noise may be temporarily superimposed on the data due to external causes such as static electricity. Because of such noise, the data received by the receiving device may differ from the data transmitted by the transmitting device.

If the receiving device fails to detect the BS data or the BE data at a timing when it should receive them, the receiving device cannot accurately reproduce the DE signal from that timing onward. If the receiving device cannot accurately reproduce the DE signal, the data that is supposed to be active data might be mistakenly treated as sync data, or conversely, the data that is supposed to be sync data might be mistakenly treated as active data. Consequently, in the video display device that receives the active data and the sync data output from the receiving device, the displayed image can become severely distorted.

An invention intended to solve such problems is disclosed in Patent Literature 2. This literature describes a transmitting and receiving system configured such that, even if the receiving device fails to detect BS data or BE data from the received data, the system reproduces the DE signal by predicting and reproducing the BS data or BE data.

By the way, as transmitting and receiving systems for transmitting video data continue to be adopted more widely, it has become necessary to further strengthen external noise resistance.

The present invention has been made to resolve the above issues and aims to provide a transmitting device, a receiving device, and a transmitting and receiving system with further strengthened external noise resistance, making it possible to accurately separate active data from sync data among the received data.

Solution to Problem

A transmitting device of the present invention is a transmitting device configured to transmit video data including active data and sync data, comprising (1) an instructor configured to, in synchronization with a reference clock and based on a DE signal that indicates respective sending periods of the active data and the sync data, indicate a first cycle of the reference clock, the first cycle being positioned immediately after a timing at which the DE signal transitions from a first level to a second level, a second cycle of the reference clock, the second cycle being positioned immediately before a timing at which the DE signal transitions from the second level to the first level, and a third cycle of the reference clock, the third cycle being positioned in which the DE signal is at the second level and is positioned for N1 cycles before the second cycle, where N1 is constant; and (2) a driver configured to transmit BS data at the first cycle, transmit BE data at the second cycle, transmit PRE_BE data at the third cycle, transmit the active data during a period in which the DE signal is at the first level, and transmit the sync data during a period in which the DE signal is at the second level.

A receiving device of the present invention comprises (1) a receiver configured to receive video data including active data and sync data, the video data being transmitted by a transmitting device based on a DE signal; (2) a detector configured to, in synchronization with a reference clock, detect from among the received video data: BS data that the transmitting device transmitted in a first cycle of the reference clock, the first cycle being positioned immediately after a timing at which the DE signal transitions from a first level to a second level, BE data that the transmitting device transmitted in a second cycle of the reference clock, the second cycle being positioned immediately before a timing at which the DE signal transitions from the second level to the first level, and PRE_BE data that the transmitting device transmitted in a third cycle of the reference clock, the third cycle being positioned at the second level 1 of the DE signal and being positioned for N1 cycles before the second cycle, where N1 is constant; (3) a BE reproducer configured to obtain a prediction cycle of the BE data that is positioned for N1 cycles after a detection cycle of the PRE_BE data obtained by the detector, where N1 is constant, and reproduce the BE data in a detection cycle of the BE data by the detector or in the prediction cycle of the BE data; (4) a BS reproducer configured to obtain a prediction cycle of the BS data that is positioned for N2 cycles after a reproduction cycle of the BE data obtained by the BE reproducer, where N2 is constant, and reproduce the BS data in a detection cycle of the BS data by the detector or in the prediction cycle of the BS data; (5) a DE signal reproducer configured to reproduce the DE signal based on the reproduction cycle of the BE data obtained by the BE reproducer and the reproduction cycle of the BS data obtained by the BS reproducer; and (6) a separator configured to, based on the DE signal reproduced by the DE signal reproducer, separate the video data received by the receiver into the active data that the transmitting device transmitted during a period in which the DE signal is at the first level and the sync data that the transmitting device transmitted during a period in which the DE signal is at the second level.

In the receiving device of the present invention, it is preferable that the BE reproducer include (a) a counter configured to count a number of elapsed cycles from the detection cycle of the PRE_BE data obtained by the detector; (b) a predictor configured to set a timing in which a count value by the counter reaches N1 cycles as a timing of the prediction cycle for the BE data, where N1 is constant; and (c) a reproducer configured to reproduce the BE data by the detection cycle of the BE data obtained by the detector or the prediction cycle of the BE data obtained by the predictor.

In the receiving device of the present invention, it is also preferable that the BS reproducer include (a) a counter configured to count a number of elapsed cycles from the reproduction cycle of the BE data obtained by the BE reproducer; (b) a predictor configured to set a timing in which a count value by the counter reaches N2 cycles as a timing of the prediction cycle for the BS data, where N2 is constant, and (c) a reproducer configured to reproduce the BS data by the detection cycle of the BS data obtained by the detector or the prediction cycle of the BS data obtained by the predictor.

A transmitting and receiving system of the present invention includes the above transmitting device of the present invention and the above receiving device of the present invention.

Effects of Invention

According to the present invention, external noise resistance is further strengthened, and the active data and sync data can be accurately separated from the received data.

DESCRIPTION OF EMBODIMENTS

Figure 1:
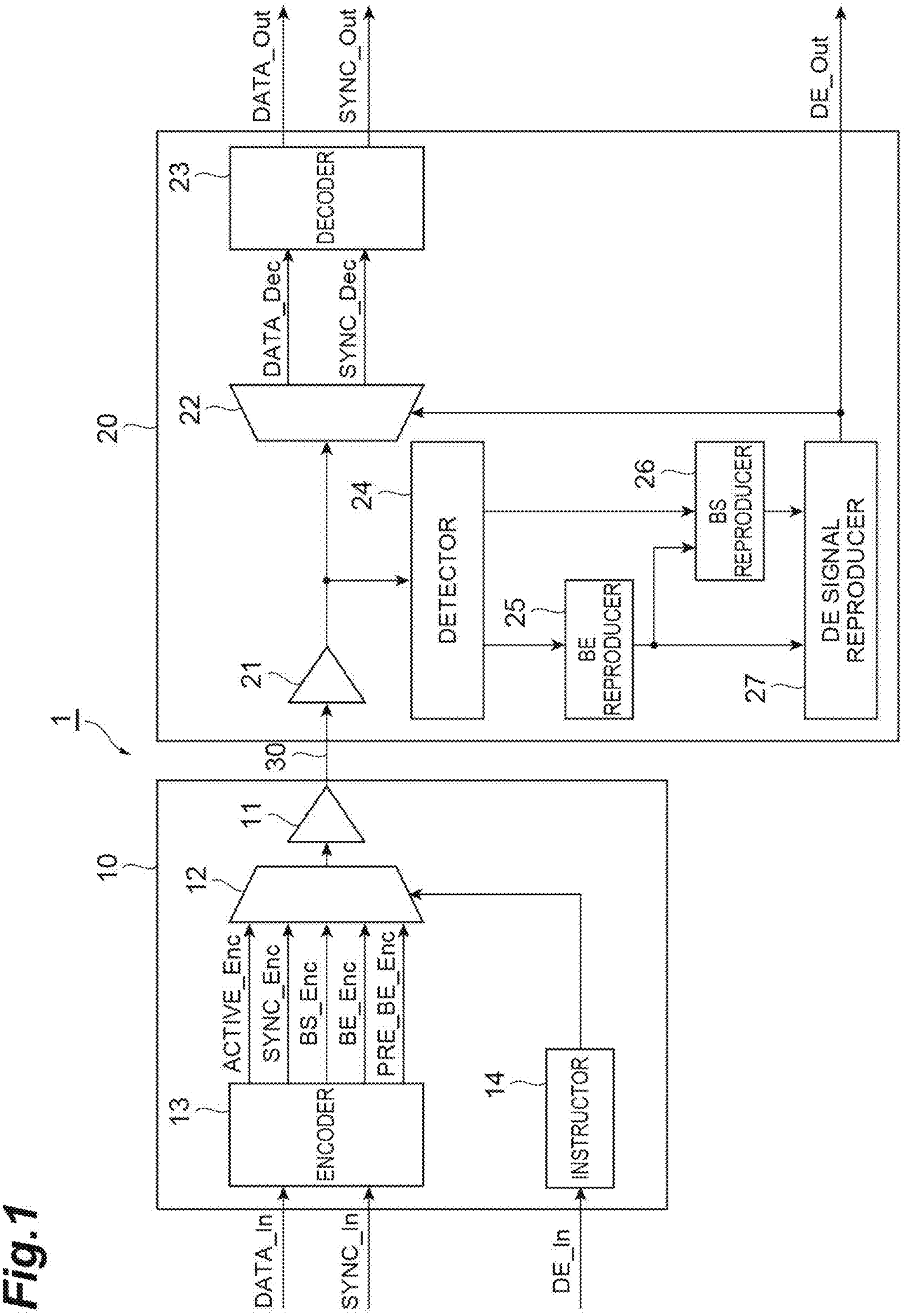
FIG. 1 is a diagram showing a configuration of a transmitting and receiving system 1.

Hereafter, embodiments for implementing the present invention will be described in detail with reference to the accompanying drawings. The same reference numbers are assigned to identical elements in the drawings, and repeated descriptions are omitted.

FIG. 1 is a diagram showing the configuration of a transmitting and receiving system 1. The transmitting and receiving system 1 comprises a transmitting device 10 and a receiving device 20. The transmitting device 10 transmits video data including active data and sync data to a transmission line 30. The receiving device 20 receives the video data output from the transmitting device 10 and arriving via the transmission line 30, separates the received video data into active data and sync data, and outputs these data to a video display device such as a liquid crystal display device.

The transmitting device 10 comprises a driver 11, a multiplexer 12, an encoder 13, and an instructor 14. The transmitting device 10 receives, in synchronization with a reference clock, a DE signal (data enable signal) DE_In, active data DATA_In, and sync data SYNC_In. The DE signal is a signal indicating respective sending periods of the active data and the sync data. The transmitting device 10 transmits the active data during a period (active period) in which the DE signal is at a first level (H level). The transmitting device 10 transmits the sync data during a period (blanking period) in which the DE signal is at a second level (L level).

Based on the level or level transition of the DE signal DE_In, the instructor 14 generates one of the following symbols: ACTIVE, BS, BE, and BP. Also, the instructor unit 14 generates PRE_BE symbol N1 cycles of the reference clock before the BE symbol, where N1 is constant. The ACTIVE symbol is generated while the DE signal DE_In is at H level. The BS symbol is generated in a cycle (the first cycle in the blanking period) of the reference clock immediately after a timing at which the DE signal DE_In transitions from H level to L level. The BE symbol is generated in a cycle (the last cycle in the blanking period, the second cycle) of the reference clock immediately before a timing at which the DE signal DE_In transitions from L level to H level. The PRE_BE symbol is generated in a cycle (third cycle) during which the DE signal DE_In is at the L level and is positioned for N1 cycles before the second cycle in which the BE symbol is generated, where N1 is constant. The BP symbol is generated in a period in which the DE signal DE_In is at L level and does not belong to any of the first through third cycles.

The encoder 13 receives the active data DATA_In and the sync data SYNC_In that are to be transmitted to the receiving device 20, and encodes these data. The encoder 13 outputs to the multiplexer 12 the following data: ACTIVE_Enc data obtained by encoding DATA_In, BS_Enc data obtained by encoding SYNC_In and BS data, BE_Enc data obtained by encoding SYNC_In and BE data, PRE_BE_Enc data obtained by encoding SYNC_In and PRE_BE data, and SYNC_Enc data obtained by encoding SYNC_In and BP data.

For example, while DATA_In and SYNC_In each comprise 8-bit data, the encoded data (ACTIVE_Enc, BS_Enc, BE_Enc, PRE_BE_Enc, SYNC_Enc) each comprise 8N-bit data. N is an integer of 2 or more, depending on the transmission bandwidth (total number of bits). Because the bandwidth for SYNC_In is smaller than that for DATA_In, it is possible to embed each of the BS, BE, and PRE_BE data in the SYNC_In's encoded data. In the timing charts described below as examples, BS_Enc, BE_Enc, and PRE_BE_Enc are embedded in Paket2[7:0] through PaketN[7:0], which are among the 8N-bit encoded data.

The multiplexer 12 receives symbols (ACTIVE, BS, BE, PRE_BE, BP) generated by the instructor 14 as well as the encoded data (ACTIVE_Enc, BS_Enc, BE_Enc, PRE_BE_Enc, SYNC_Enc) generated by the encoder 13. In accordance with the input symbol, the multiplexer 12 selects one of the encoded data and outputs it. If the input symbol is the ACTIVE symbol, the multiplexer 12 outputs ACTIVE_Enc data to the driver 11. If the input symbol is the BS symbol, the multiplexer 12 outputs BS_Enc data to the driver 11. If the input symbol is the BE symbol, the multiplexer 12 outputs BE_Enc data to the driver 11. If the input symbol is the PRE_BE symbol, the multiplexer 12 outputs PRE_BE_Enc data to the driver 11. If the input symbol is the BP symbol, the multiplexer 12 outputs SYNC_Enc data to the driver 11.

The driver 11 sends the data output from the multiplexer 12 to the transmission line 30. The data that has been sent is then received by the receiving device 20 via the transmission line 30.

The receiving device 20 receives the video data, which includes active data and sync data, sent from the transmitting device 10 based on the DE signal. The receiving device 20 comprises a receiver 21, a demultiplexer 22, a decoder 23, a detector 24, a BE reproducer 25, a BS reproducer 26, and a DE signal reproducer 27.

The receiver 21 receives data sent from the transmitting device 10 via the transmission line 30. From among the data received by the receiver 21, the detector 24 detects the BS data, the BE data, and the PRE_BE data. Namely, the detector 24 detects the BS data, which is transmitted from the transmitting device 10 in the first cycle (the cycle of the reference clock positioned immediately after the timing of the transition of the DE signal from H level to L level). The detector 24 detects the BE data, which is transmitted from the transmitting device 10 in the second cycle (the cycle of the reference clock positioned immediately before the timing of the transition of the DE signal from L level to H level). The detector 24 detects the PRE_BE data, which is transmitted from the transmitting device 10 in the third cycle (the cycle of the reference clock positioned at the timing that is N1 cycles before the second cycle, where N1 is constant).

The BE reproducer 25 obtains a prediction cycle of the BE data that is positioned for N1 cycles after the detection cycle in which the detector 24 detected the PRE_BE data, where N1 is constant. The BE reproducer 25 reproduces the BE data in either the detection cycle of the BE data detected by the detector 24 or the prediction cycle of the BE data.

The BS reproducer 26 obtains a prediction cycle of the BS data that is positioned for N2 cycles after the reproduction cycle of the BE data by the BE reproducer 25, where N2 is constant. The BS reproducer 26 reproduces the BS data in either the detection cycle of the BS data detected by the detector 24 or the prediction cycle of the BS data.

The DE signal reproducer 27 reproduces the DE signal DE_out based on the reproduction cycle of the BE data by the BE reproducer 25 and the reproduction cycle of the BS data by the BS reproducer 26. In the reproduced DE_out, the level transitions from H level to L level at a timing when the detector 24 detects the BS data, and transitions from L level to H level at a timing when the detector 24 detects the BE data. The DE signal reproducer 27 supplies this DE_out to the demultiplexer 22.

The demultiplexer 22 receives the DE_out output from the DE signal reproducer 27 and also receives the data received by the receiver 21. The demultiplexer 22 is a separator that separates the received data into active data and sync data based on the level of DE_out. The demultiplexer 22 outputs as active data DATA_Dec the data received during the period in which DE_out is H level. The demultiplexer 22 outputs as sync data SYNC_Dec the data received during the period in which DE_out is L level. During the period in which DE_out is H level, DATA_Dec is the data corresponding to ACTIVE_Enc, and SYNC_Dec is treated as "Don't Care". During the period in which DE_out is L level, DATA_Dec is treated as "Don't Care", and SYNC_Dec is the data corresponding to BS_Enc/BE_Enc/BP_Enc.

The decoder 23 decodes the DATA_Dec output from the demultiplexer 22 to output active data DATA_Out, and decodes the SYNC_Dec output from the demultiplexer 22 to output sync data SYNC_Out.

The DE_Out output from the receiving device 20 is a reproduction of the DE_In input to the transmitting device 10. The DATA_Out output from the receiving device 20 is a reproduction of the DATA_In input to the transmitting device 10. The SYNC_Out output from the receiving device 20 is a reproduction of the SYNC_In input to the transmitting device 10.

The data transmitted from the transmitting device 10 to the receiving device 20 are encoded by the encoder 13 using a symbol-mapping scheme (e.g., 8B10B encoding). The description below will refer to an example using 8B10B encoding. Among such 8B10B encodings, ACTIVE_Enc and SYNC_Enc correspond to D-codes, whereas BS_Enc, BE_Enc, and PRE_BE_Enc correspond to K-codes. This 8B10B encoding is widely used in serial transmission such as USB and Display-Port.

Both D-code and K-code encode 8-bit data into 10-bit data. In other words, in both D-code and K-code, 8 bits of information correspond to 10-bit symbols. In general, 8-bit data can represent 256 (=$2^8$) possible values, whereas 10-bit data can represent 1024 (=$2^{10}$) possible values. In D-code encoding, all 8-bit data are encoded into 10-bit data, whereas in K-code encoding, twelve specific 8-bit data sets are encoded into 10-bit data. Therefore, the 10-bit data which can represent 1024 possible values can include 10-bit data generated by the D-codes and 10-bit data generated by the K-codes.

For instance, in binary notation for both the 8-bit data and 10-bit data, the 8-bit data [0001_1100] corresponds to [00_1111_0100] and [11_0000_1011] in 10-bit K-code data, and to [00_1110_1011] and [00_1110_0100] in 10-bit D-code data. Thus, even if the 8-bit data are the same, the 10-bit data in K-code differs from 10-bit data in D-code. Because no 10-bit data in K-code ever matches any 10-bit data in D-code, it is possible to identify whether any given 10-bit data is a K-code or a D-code.

By designating ACTIVE_Enc and SYNC_Enc data as D-codes, and designating the BS_Enc, BE_Enc, and PRE_BE_Enc data as mutually different K-codes, it is possible to assign 256 possible values to DATA_In and thus ensure sufficient transmission bandwidth, and also to allow the detector 24 in the receiving device 20 to detect, from among the received data, the respective BS, BE, and PRE_BE data.

Figure 2:
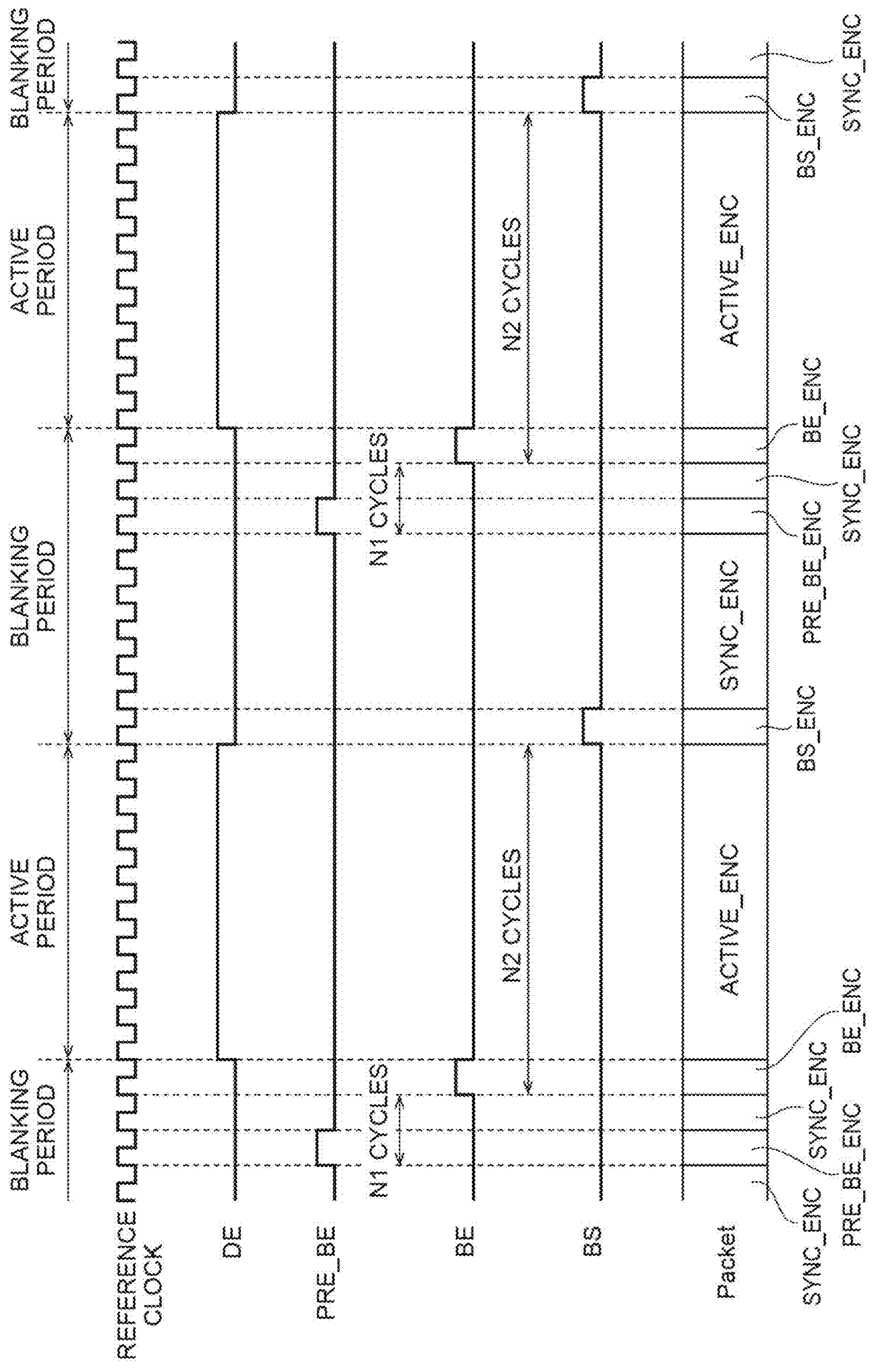
FIG. 2 is a timing chart of a reference clock, a DE signal, each symbol (PRE_BE, BE, BS), and a driver output signal.

FIG. 2 is a timing chart showing the reference clock, the DE signal, each symbol (PRE_BE, BE, BS), and the driver output signal. In the figure, N1=2 and N2=10. As shown in the figure, BS_ENC is transmitted at the first cycle in the blanking period, and BE_ENC is transmitted at the last cycle in the blanking period. PRE_BE_ENC is transmitted N1 cycles before the BE_ENC transmission cycle within the blanking period. Also, BS_ENC is transmitted N2 cycles after the BE_ENC transmission cycle. Each of N1 and N2 is a fixed value. N2 is a value obtained by adding 1 to the number of cycles in the active period. The number of cycles in the active period is fixed. The number of cycles in the blanking period can vary.

Figure 3:
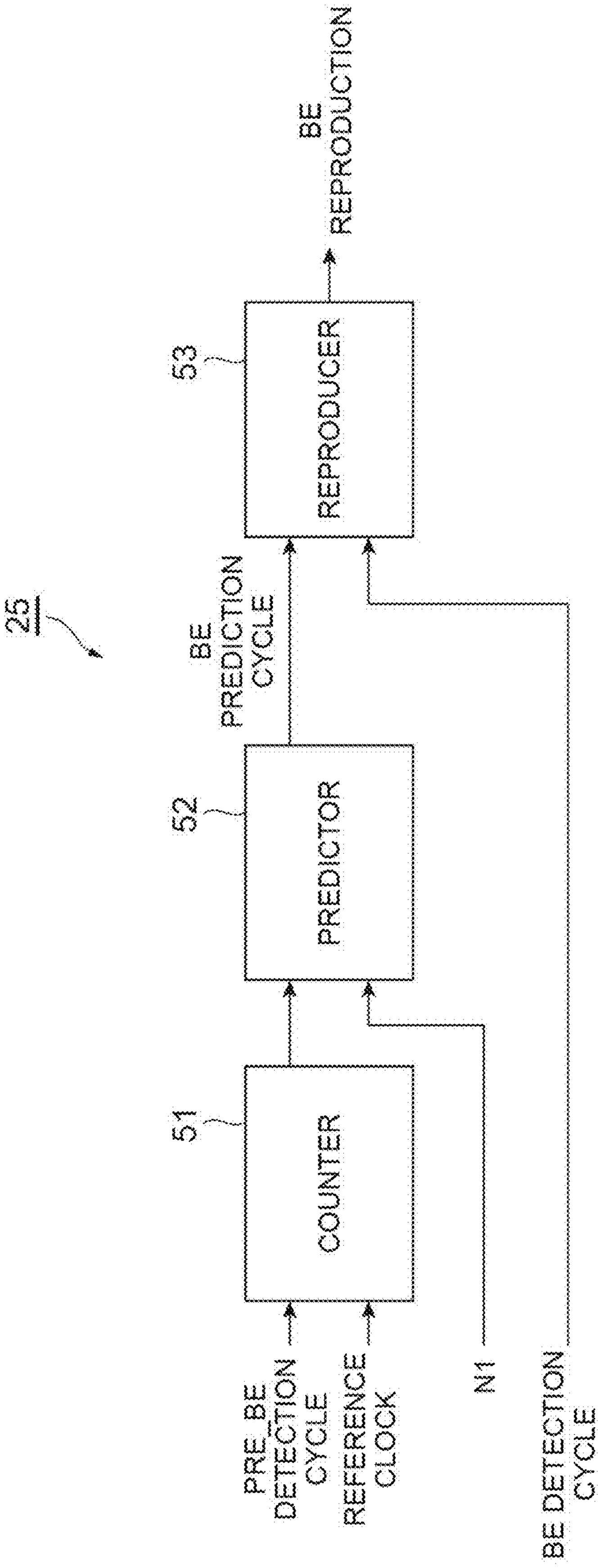
FIG. 3 is a diagram showing a configuration example of a BE reproducer 25.

FIG. 3 is a diagram showing an example configuration of the BE reproducer 25. The BE reproducer 25 includes a counter 51, a predictor 52, and a reproducer 53. When the detector 24 detects PRE_BE data, the counter 51 initializes its count value at the timing of that PRE_BE detection cycle, starts counting pulses of the reference clock, and counts the elapsed number of cycles starting from the PRE_BE detection cycle. The predictor 52 treats the timing at which the count value of the counter 51 reaches N1 cycles as the prediction cycle of the BE data, where N1 is constant. The reproducer 53 reproduces the BE data either in the detection cycle of the BE data by the detector 24 or in the prediction cycle of the BE data by the predictor 52.

Figure 4:
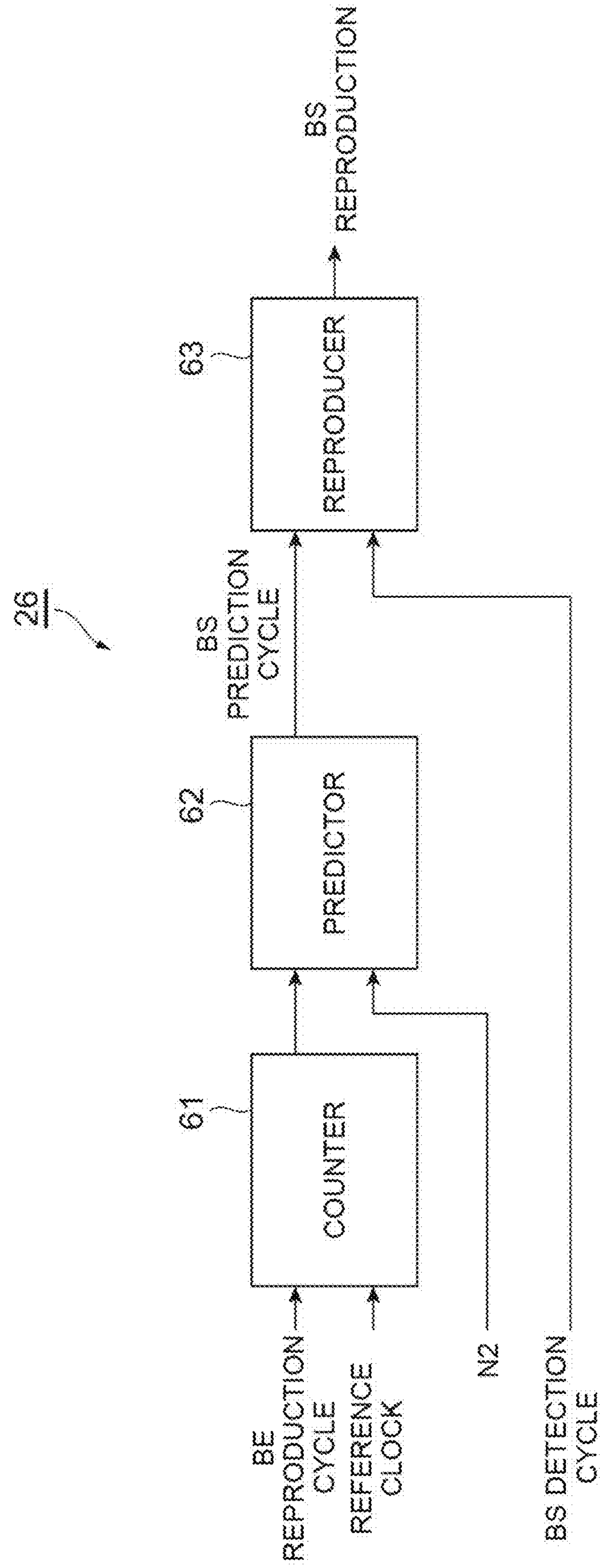
FIG. 4 is a diagram showing a configuration example of a BS reproducer 26.

FIG. 4 is a diagram showing an example configuration of the BS reproducer 26. The BS reproducer 26 includes a counter 61, a predictor 62, and a reproducer 63. When the BE reproducer 25 reproduces the BE data, the counter unit 61 initializes its count value at the timing of that BE reproduction cycle, starts counting pulses of the reference clock, and counts the elapsed number of cycles starting from the BE reproduction cycle. The predictor 62 treats the timing at which the count value of the counter 61 reaches N2 cycles as the prediction cycle of the BS data, where N2 is constant. The reproducer 63 reproduces the BS data either in the detection cycle of the BS data by the detection unit 24 or in the prediction cycle of the BS data by the predictor 62.

In the receiving device 20, when at least one of the PRE_BE data and BE data is detected by the detector 24 in each blanking period, the BE reproducer 25 can reproduce the BE data, and the BS reproducer 26 can reproduce the BS data. The DE signal reproducer 27 can then reproduce the DE signal.

On the other hand, if both the PRE_BE data and the BE data are not detected by the detector 24 in a given blanking period in the receiving device 20, the DE signal cannot be reproduced. In such a case, the image displayed on a video display device that receives data from the receiving device 20 would become severely distorted.

However, the period during which noise is temporarily superimposed on the data, caused by external factors such as static electricity while data are transmitted from the transmitting device 10 to the receiving device 20 via the transmission line 30, is generally very short. Thus, the frequency of an event in which both the PRE_BE data and the BE data are not detected by the detector 24 is extremely low compared to the frequency of an event in which only the BE data is not detected by the detector 24. Accordingly, in the transmitting and receiving system 1 of this embodiment, which transmits not only the BE data but also the PRE_BE data N1 cycles earlier, where N1 is a fixed value, in each blanking period, the external noise resistance is further enhanced.

Next, examples of operation of the transmitting and receiving system 1 will be described with reference to FIG. 5 through FIG. 8. These figures show data (DE_In, DATA_In, SYNC_In) input to the transmitting device 10, symbols (ACTIVE, BS, BE, PRE_BE, BP) generated by the instructor 14 of the transmitting device 10, and encoded data (Paket0[7:0] through PaketN[7:0]) output from the transmitting device 10. Also shown are the respective detections of PRE_BE, BE, and BS by the detector 24 of the receiving device 20, the reproduction of BE by the BE reproducer 25 of the receiving device 20, and the reproduction of BS by the BS reproducer 26 of the receiving device 20.

Figure 5:
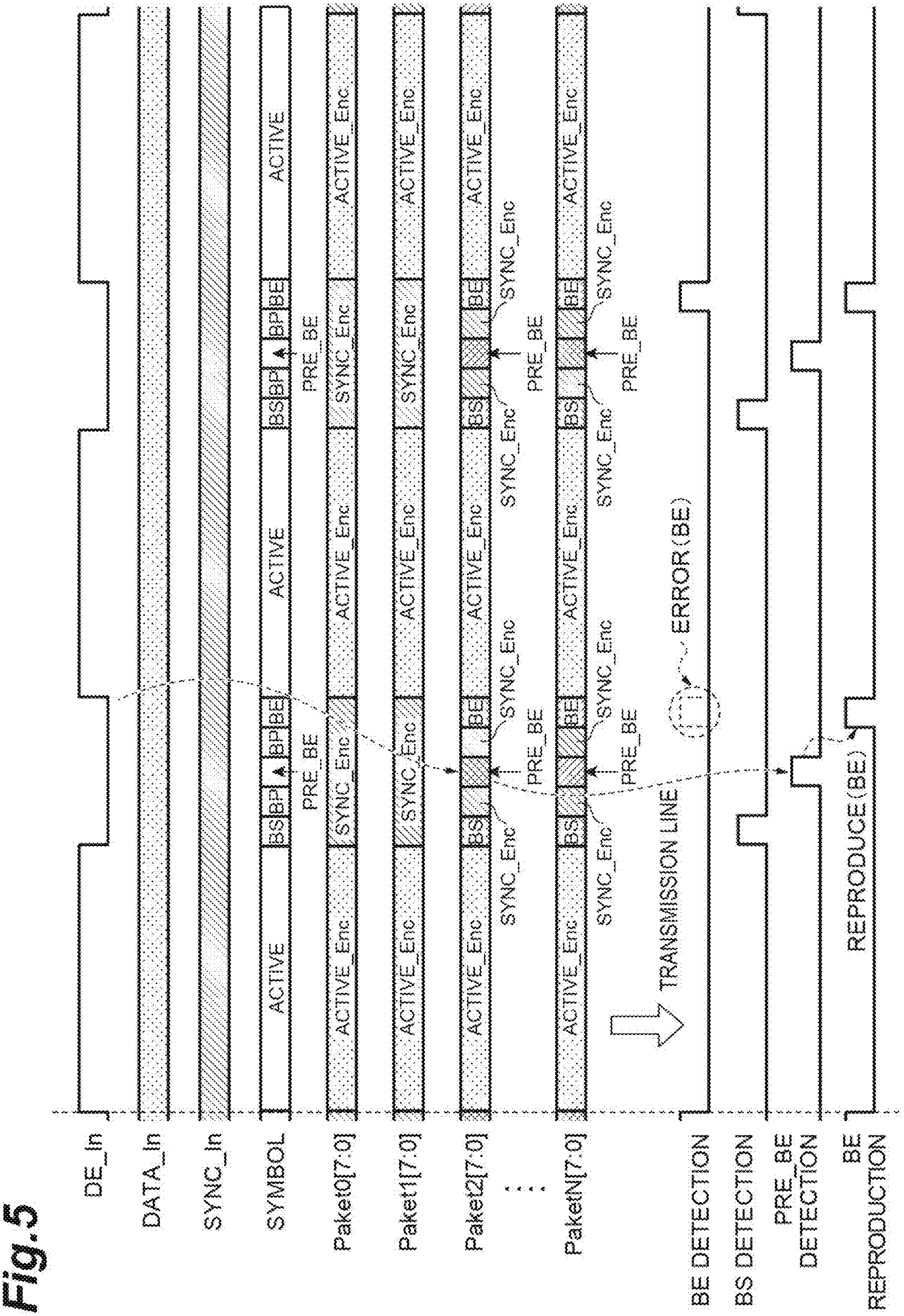
FIG. 5 is a timing chart for explaining a first operation example of the transmitting and receiving system 1.

FIG. 5 is a timing chart for explaining a first operation example of the transmitting and receiving system 1. In the first operation example, among PRE_BE, BE, and BS data in the receiving device 20, the BE data is not detected by the detector 24 (ERROR(BE)) due to external noise or other factors. In this case, the BE reproducer 25 reproduces the BE data N1 cycles after the PRE_BE detection cycle by the detector 24 (REPRODUCE(BE)), where N1 is constant.

Figure 6:
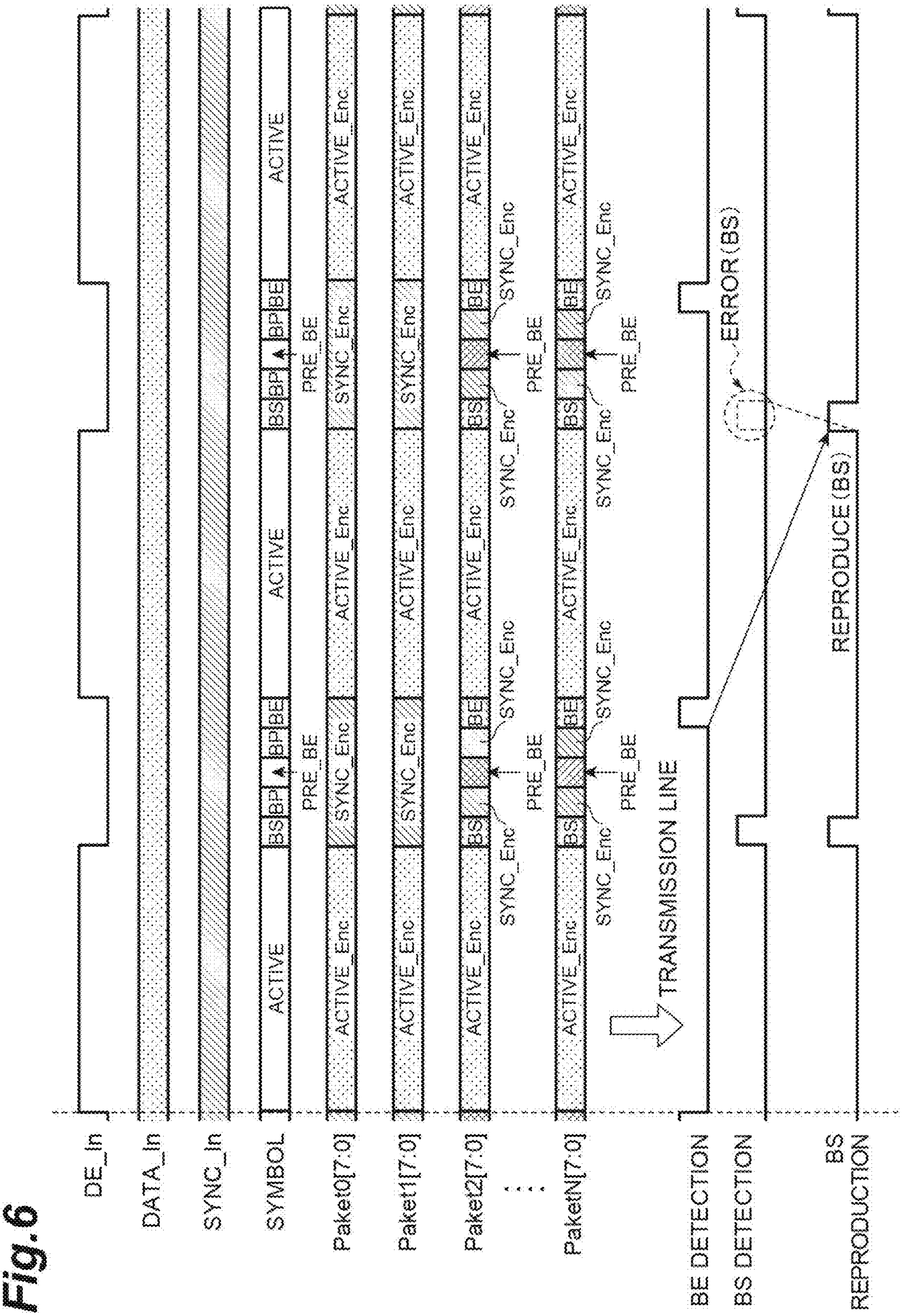
FIG. 6 is a timing chart for explaining a second operation example of the transmitting and receiving system 1.

FIG. 6 is a timing chart for explaining a second operation example of the transmitting and receiving system 1. In the second operation example, among PRE_BE, BE, and BS data in the receiving device 20, the BS data is not detected by the detector 24 (ERROR(BS)) due to external noise or other factors. In this case, the BS reproducer 26 reproduces the BS data N2 cycles after the reproduction cycle of the BE data by the BE reproducer 25, where N2 is constant. Namely, the BS reproducer 26 reproduces the BS data after counting a second period from the start or end timing of the BE data (REPRODUCE(BS)).

Figure 7:
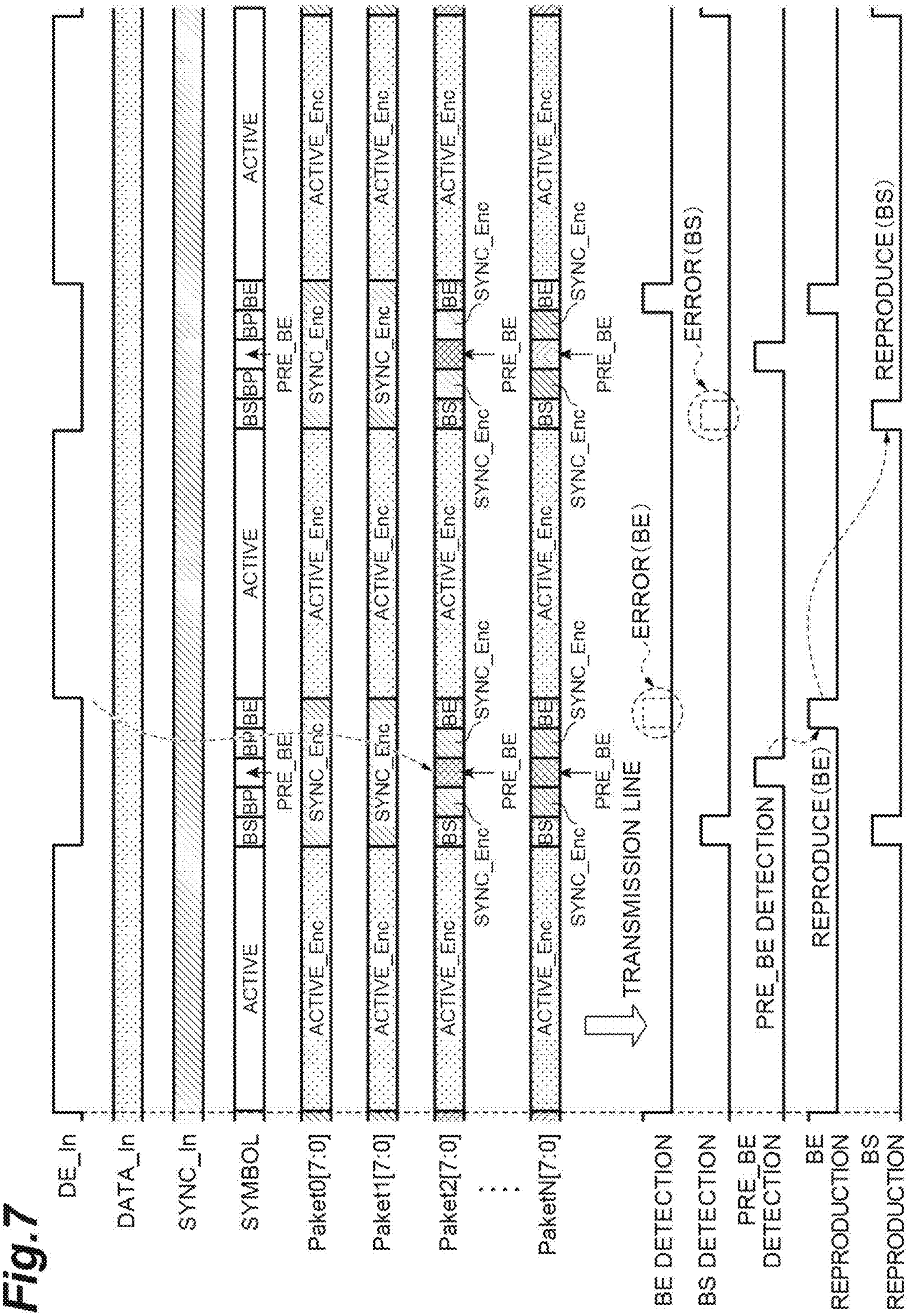
FIG. 7 is a timing chart for explaining a third operation example of the transmitting and receiving system 1.

FIG. 7 is a timing chart for explaining a third operation example of the transmitting and receiving system 1. In the third operation example, among the PRE_BE, BE, and BS data in the receiving device 20, the BE data is not detected by the detector 24 (ERROR(BE)) due to external noise or other factors, and the BS data is also not detected by the detector 24 (ERROR(BS)) due to external noise or other factors. In this situation, the BE reproducer 25 reproduces the BE data N1 cycles after the PRE_BE detection cycle by the detector 24, where N1 is constant. Namely, the BE reproducer 25 creates the BE data (REPRODUCE(BE)) after counting a first period from the timing at which the PRE_BE data is detected (PRE_BE DETECTION). Then, the BS reproducer 26 reproduces the BS data N2 cycles after the BE data reproduction cycle by the BE reproducer 25, where N2 is constant. Namely, the BS reproducer 26 reproduces the BS data (REPRODUCE(BS)) after counting a second period from the start or end timing of the BE data.

Figure 8:
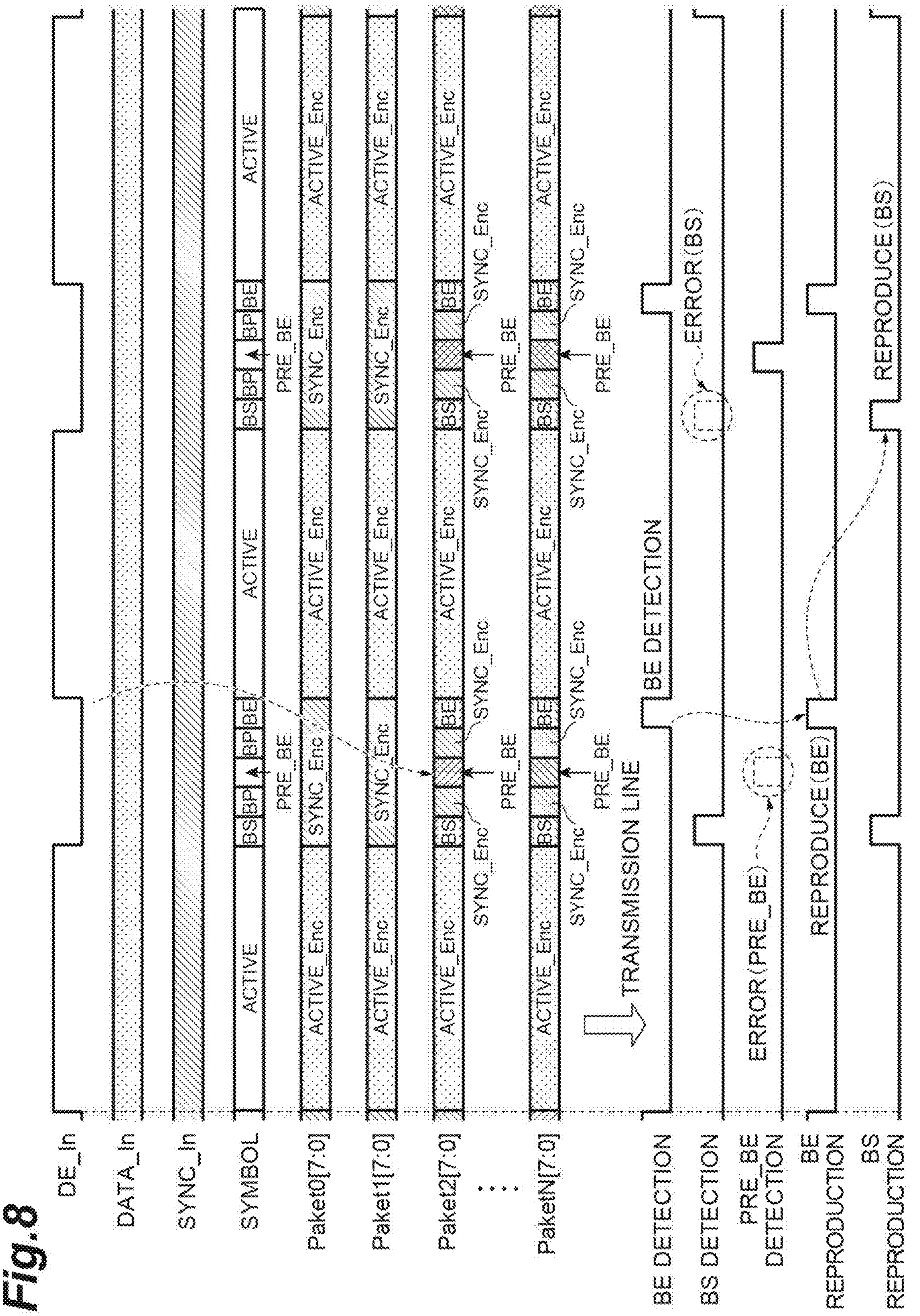
FIG. 8 is a timing chart for explaining a fourth operation example of the transmitting and receiving system 1.

FIG. 8 is a timing chart for explaining a fourth operation example of the transmitting and receiving system 1. In the fourth operation example, among the PRE_BE, BE, and BS data in the receiving device 20, the PRE_BE data is not detected by the detector 24 (ERROR(PRE_BE)) due to external noise or other factors, and the BS data is also not detected by the detector 24 (ERROR(BS)) due to external noise or other factors. In this situation, the BE reproducer 25 reproduces the BE data in the BE detection cycle by the detector 24 (REPRODUCE(BE)). Namely, the BE reproducer 25 reproduces the BE data (REPRODUCE(BE)) in synchronization with the BE detection (BE DETECTION). Then, the BS reproducer 26 reproduces the BS data N2 cycles after the BE data reproduction cycle by the BE reproducer 25, where N2 is constant. Namely, the BS reproducer 26 reproduces the BS data (REPRODUCE(BS)) after counting a second period from the start or end timing of the BE data.

Note that each circuit block for the above elements can be configured using logic circuits. In any of the first through fourth operation examples, the receiving device 20 can reproduce both the BE data and the BS data and can thus reproduce the DE signal. In this manner, the transmitting and receiving system 1 of the present embodiment, which transmits not only the BE data but also the PRE_BE data N1 cycles earlier in each blanking period, provides further strengthened external noise resistance, where N1 is constant.

The present invention is not limited to the above examples and is defined by the scope of the claims, with the intention that all modifications within the meaning and range equivalent to the claims are included.

REFERENCE SIGNS LIST

1 . . . transmitting and receiving system; 10 . . . transmitting device; 11 . . . driver; 12 . . . multiplexer; 13 . . . encoder; 14 . . . instructor; 20 . . . receiving device; 21 . . . receiver; 22 . . . demultiplexer; 23 . . . decoder; 24 . . . detector; 25 . . . BE reproducer; 26 . . . BS reproducer; 27 . . . DE signal reproducer; 30 . . . transmission line; 51 . . . counter; 52 . . . predictor; 53 . . . reproducer; 61 . . . counter; 62 . . . predictor; 63 . . . reproducer.

The invention claimed is:

1. A transmitting device configured to transmit video data including active data and sync data, comprising:

an instructor configured to, in synchronization with a reference clock and based on a data enable (DE) signal that indicates respective sending periods of the active data and the sync data, indicate a first cycle of the reference clock, the first cycle being positioned immediately after a timing at which the DE signal transitions from a first level to a second level, a second cycle of the reference clock, the second cycle being positioned immediately before a timing at which the DE signal transitions from the second level to the first level, and a third cycle of the reference clock, the third cycle being positioned when the DE signal is at the second level and is positioned for N1 cycles before the second cycle, where N1 is constant; and a driver configured toto:

transmit blank start (BS) data at the first cycle, transmit blank end (BE) data at the second cycle, transmit pre blank end (PRE_BE) data at the third cycle, transmit the active data during a period in which the DE signal is at the first level, and transmit the sync data during a period in which the DE signal is at the second level.

2. A receiving device, comprising:

a receiver configured to receive video data including active data and sync data, the video data being transmitted by a transmitting device based on a data enable (DE)DE signal;

a detector configured to, in synchronization with a reference clock, detect from among the received video data:

blank start (BS) data that the transmitting device transmitted in a first cycle of the reference clock, the first cycle being positioned immediately after a timing at which the DE signal transitions from a first level to a second level, blank end (BE) data that the transmitting device transmitted in a second cycle of the reference clock, the second cycle being positioned immediately before a timing at which the DE signal transitions from the second level to the first level, and pre blank end (PRE_BE) data that the transmitting device transmitted in a third cycle of the reference clock, the third cycle being positioned at the second level of the DE signal and being positioned for N1 cycles before the second cycle, where N1 is constant;

a BE reproducer configured to obtain a prediction cycle of the BE data that is positioned for N1 cycles after a detection cycle of the PRE_BE data obtained by the detector, and reproduce the BE data in a detection cycle of the BE data by the detector or in the prediction cycle of the BE data, where N1 is constant;

a BS reproducer configured to obtain a prediction cycle of the BS data that is positioned for N2 cycles after a reproduction cycle of the BE data obtained by the BE reproducer, where N2 is constant, and reproduce the BS data in a detection cycle of the BS data by the detector or in the prediction cycle of the BS data;

a DE signal reproducer configured to reproduce the DE signal based on the reproduction cycle of the BE data obtained by the BE reproducer and the reproduction cycle of the BS data obtained by the BS reproducer; and a separator configured to, based on the DE signal reproduced by the DE signal reproducer, separate the video data received by the receiver into the active data that the transmitting device transmitted during a period in which the DE signal is at the first level and the sync data that the transmitting device transmitted during a period in which the DE signal is at the second level.

3. The receiving device according to claim 2, wherein:

the BE reproducer comprises:

a counter configured to count a number of elapsed cycles from the detection cycle of the PRE_BE data obtained by the detector;

a predictor configured to set a timing in which a count value by the counter reaches N1 cycles as a timing of the prediction cycle for the BE data, where N1 is constant; and a reproducer configured to reproduce the BE data by the detection cycle of the BE data obtained by the detector or the prediction cycle of the BE data obtained by the predictor.

4. The receiving device according to claim 2, wherein:

the BS reproducer comprises:

a counter configured to count a number of elapsed cycles from the reproduction cycle of the BE data obtained by the BE reproducer, a predictor configured to set a timing in which a count value by the counter reaches N2 cycles as a timing of the prediction cycle for the BS data, where N2 is constant, and a reproducer configured to reproduce the BS data by the detection cycle of the BS data obtained by the detector or the prediction cycle of the BS data obtained by the predictor.

5. A transmitting and receiving system, comprising a transmitting device and a receiving device, wherein the transmitting device configured to transmit video data including active data and sync data, comprises:

an instructor configured to, in synchronization with a reference clock and based on a data enabled (DE) signal that indicates respective sending periods of the active data and the sync data, indicate a first cycle of the reference clock, the first cycle being positioned immediately after a timing at which the DE signal transitions from a first level to a second level, a second cycle of the reference clock, the second cycle being positioned immediately before a timing at which the DE signal transitions from the second level to the first level, and a third cycle of the reference clock, the third cycle being positioned in which the DE signal is at the second level and is positioned for N1 cycles before the second cycle, where N1 is constant; and a driver configured toto:

transmit blank start (BS) data at the first cycle, transmit blank end (BE) data at the second cycle, transmit pre blank end (PRE_BE) data at the third cycle, transmit the active data during a period in which the DE signal is at the first level, and transmit the sync data during a period in which the DE signal is at the second level; and wherein the receiving device comprises:

a receiver configured to receive the video data including the active data and the sync data, the video data being transmitted by the transmitting device based on the DE signal;

a detector configured to, in synchronization with a reference clock, detect from among the received video data:

BS data that the transmitting device transmitted in a first cycle of the reference clock, the first cycle being positioned immediately after a timing at which the DE signal transitions from a first level to a second level, BE data that the transmitting device transmitted in a second cycle of the reference clock, the second cycle being positioned immediately before a timing at which the DE signal transitions from the second level to the first level, and PRE_BE data that the transmitting device transmitted in a third cycle of the reference clock, the third cycle being positioned at the second level of the DE signal and being positioned for N1 cycles before the second cycle, where N1 is constant;

a BE reproducer configured to obtain a prediction cycle of the BE data that is positioned for N1 cycles after a detection cycle of the PRE_BE data obtained by the detector, and reproduce the BE data in a detection cycle of the BE data by the detector or in the prediction cycle of the BE data, where N1 is constant;

a BS reproducer configured to obtain a prediction cycle of the BS data that is positioned for N2 cycles after a reproduction cycle of the BE data obtained by the BE reproducer, where N2 is constant, and reproduce the BS data in a detection cycle of the BS data by the detector or in the prediction cycle of the BS data;

a DE signal reproducer configured to reproduce the DE signal based on the reproduction cycle of the BE data obtained by the BE reproducer and the reproduction cycle of the BS data obtained by the BS reproducer; and a separator configured to, based on the DE signal reproduced by the DE signal reproducer, separate the video data received by the receiver into the active data that the transmitting device transmitted during a period in which the DE signal is at the first level and the sync data that the transmitting device transmitted during a period in which the DE signal is at the second level.

6. The transmitting and receiving system according to claim 5, wherein:

the BE reproducer comprises:

a counter configured to count a number of elapsed cycles from the detection cycle of the PRE_BE data obtained by the detector, a predictor configured to set a timing in which a count value by the counter reaches N1 cycles as a timing of the prediction cycle for the BE data, where N1 is constant;

a reproducer configured to reproduce the BE data by the detection cycle of the BE data obtained by the detector or the prediction cycle of the BE data obtained by the predictor.

7. The transmitting and receiving system according to claim 5, wherein:

the BS reproducer comprises:

a counter configured to count a number of elapsed cycles from the reproduction cycle of the BE data obtained by the BE reproducer, a predictor configured to set a timing in which a count value by the counter reaches N2 cycles as a timing of the prediction cycle for the BS data, where N2 is constant, and a reproducer configured to reproduce the BS data by the detection cycle of the BS data obtained by the detector or the prediction cycle of the BS data obtained by the predictor.

* * * * *